United States Patent
Kikuchi et al.

(10) Patent No.: US 10,641,454 B2
(45) Date of Patent: May 5, 2020

(54) VEHICLE LAMP THAT PROJECTS SCANNING BEAM SCANNED BY OPTICAL SCANNING SYSTEM TO FORM FIRST PATTERN, AND THAT PROJECTS EMISSION BEAM OF SECOND LIGHT SOURCE SECTION TO FORM SECOND PATTERN

(71) Applicant: KOITO MANUFACTURING CO., LTD., Tokyo (JP)

(72) Inventors: Satoshi Kikuchi, Shizuoka (JP); Tomoyuki Ichikawa, Shizuoka (JP); Takao Muramatsu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/015,361

(22) Filed: Jun. 22, 2018

(65) Prior Publication Data
US 2018/0372295 A1    Dec. 27, 2018

(30) Foreign Application Priority Data

Jun. 22, 2017 (JP) .................................. 2017-121969

(51) Int. Cl.
| | | |
|---|---|---|
| *F21S 41/675* | (2018.01) | |
| *F21S 41/27* | (2018.01) | |
| *F21S 41/148* | (2018.01) | |
| *B60Q 1/14* | (2006.01) | |
| *F21S 41/32* | (2018.01) | |
| *F21S 41/19* | (2018.01) | |
| *F21S 41/33* | (2018.01) | |

(Continued)

(52) U.S. Cl.
CPC ............ *F21S 41/675* (2018.01); *B60Q 1/143* (2013.01); *B60Q 1/1423* (2013.01); *F21S 41/147* (2018.01); *F21S 41/148* (2018.01); *F21S 41/153* (2018.01); *F21S 41/19* (2018.01); *F21S 41/255* (2018.01); *F21S 41/27* (2018.01); *F21S 41/321* (2018.01); *F21S 41/336* (2018.01); *F21S 41/663* (2018.01); *B60Q 2300/056* (2013.01)

(58) Field of Classification Search
CPC ............................... F21S 41/675; F21S 41/67
See application file for complete search history.

(56) References Cited

U.S. PATENT DOCUMENTS 9,212,800 B2 * 12/2015 Tanaka ..................... F21S 41/19
9,890,910 B2 *  2/2018 Yamamura ............ F21S 10/026
(Continued)

FOREIGN PATENT DOCUMENTS

| | | |
|---|---|---|
| JP | 2008-205357 A | 9/2008 |
| JP | 2012224317 A | 11/2012 |
| WO | 2016/167250 A1 | 10/2016 |

*Primary Examiner* — Robert J May
(74) *Attorney, Agent, or Firm* — Osha Liang LLP

(57) ABSTRACT

There is provided a vehicle lamp includes a first light source part, a second light source part, a scanning optical system which scans an emission beam from the first light source part by repeating a periodical motion, and a lighting circuit which independently drives the first light source part and the second light source part. A scanning beam scanned by the scanning optical system is projected to form a first pattern, and an emission beam from the second light source part is projected to form a second pattern.

9 Claims, 13 Drawing Sheets

(51) Int. Cl.
  *F21S 41/255* (2018.01)
  *F21S 41/153* (2018.01)
  *F21S 41/663* (2018.01)
  *F21S 41/147* (2018.01)

(56) References Cited

U.S. PATENT DOCUMENTS

2008/0203946 A1   8/2008  Ito et al.
2014/0042325 A1   2/2014  Yamamura
2016/0348865 A1* 12/2016 Nakazawa .............. H01S 5/042
2018/0043820 A1   2/2018  Murakami et al.

* cited by examiner

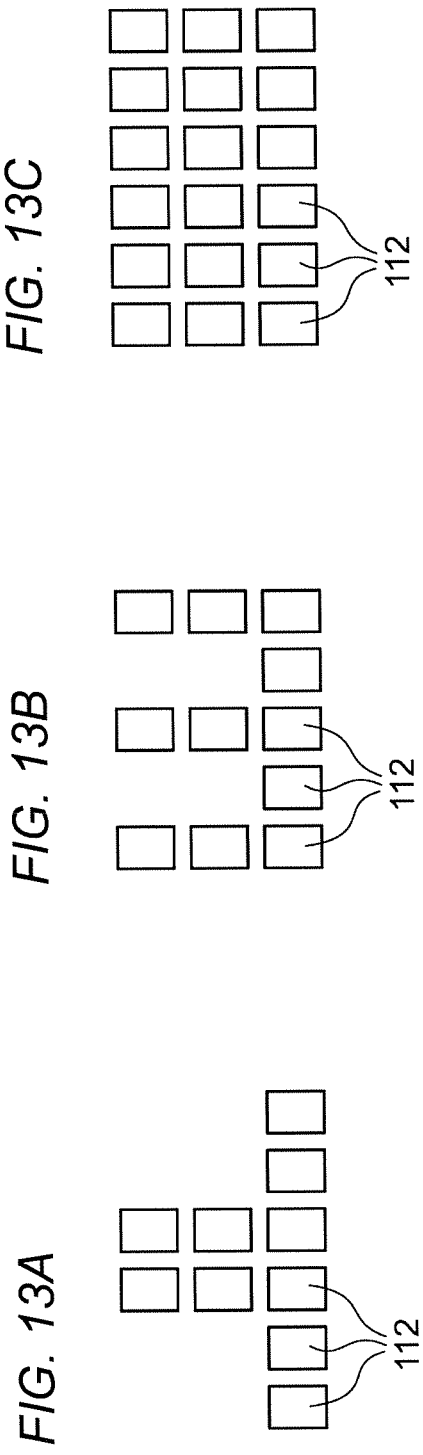

VEHICLE LAMP THAT PROJECTS SCANNING BEAM SCANNED BY OPTICAL SCANNING SYSTEM TO FORM FIRST PATTERN, AND THAT PROJECTS EMISSION BEAM OF SECOND LIGHT SOURCE SECTION TO FORM SECOND PATTERN

CROSS-REFERENCE TO RELATED APPLICATIONS

The present application claims the benefit of priority of Japanese Patent Application No. 2017-121969, filed on Jun. 22, 2017, the content of which is incorporated herein by reference.

TECHNICAL FIELD

Aspects of the present invention relate to a vehicle lamp for an automobile or the like.

BACKGROUND

A vehicle lamp can generally switch between a low beam and a high beam. The low beam provides a predetermined illumination for a nearby area and has a light distribution designed not to give glare to an oncoming vehicle or a preceding vehicle. The low beam is mainly used when driving in urban areas. On the other hand, the high beam provides a bright illumination for a front wide area and a distant area and is mainly used when driving at high speed on a road with few oncoming vehicles or preceding vehicles. Therefore, although the high beam gives better visibility to a driver than the low beam, the high beam would give glare to a driver of a preceding vehicle or a pedestrian in front of the vehicle.

In recent years, Adaptive Driving Beam (ADB) technique which dynamically and adaptively controls a light distribution pattern of a high beam based on conditions surrounding the vehicle has been proposed. The ADB technique reduces glare to a vehicle or a pedestrian by detecting presence of a preceding vehicle, an oncoming vehicle or a pedestrian in front of the vehicle and reducing light of an area corresponding to the detected vehicle or pedestrian.

As a method for realizing an ADB function, a shutter method for controlling an actuator, a rotary method, an LED array method, or the like have been proposed. In the shutter method or the rotary method, a width of a turning-off region (light blocking region) can be continuously changed, but the number of turning-off regions is limited to one. In the LED array method, a plurality of turning-off regions can be set, but since the width of each of the turning-off regions is restricted by an illumination width of a LED chip, the width of the turning-off regions would be discrete.

The applicant of the present application has proposed a scanning method as an ADB method capable of solving these problems (refer to Patent Document 2). In the scanning method, light is made incident on a rotating reflector (blade), the incident light is reflected at an angle corresponding to a rotational position of the reflector, and the reflected light is scanned in front of a vehicle while a desired light distribution pattern is formed in front of the vehicle by turning on/off a light source or changing a light amount according to the rotational position of the reflector.

PRIOR ART DOCUMENT

Patent Document 1: JP-A-2008-205357
Patent Document 2: JP-A-2012-224317
Patent Document 3: WO 2016/167250A1

SUMMARY

The present invention has been made in view of the above circumstances, and an aspect of the present invention provides a vehicle lamp capable of forming an appropriate light distribution under various circumstances.

According to an aspect of the present invention, there is provided a vehicle lamp including a first light source part, a second light source part, a scanning optical system which is configured to scan an emission beam from the first light source part by repeating a periodical motion, and a lighting circuit which is configured to independently drive the first light source part and the second light source part, wherein a scanning beam scanned by the scanning optical system is projected to form a first pattern, and an emission beam from the second light source part is projected to form a second pattern.

Any combination of the above configuration elements, and the configuration elements and expressions of the present invention applied in methods, apparatus, systems, or the like are also effective as aspects of the present invention.

According to the above configuration, in a scanning type vehicle lamp, the appropriate light distribution can be formed under various circumstances.

BRIEF DESCRIPTION OF DRAWINGS

FIGS. 13A to 13C are diagrams illustrating modifications of layouts of light emitting units.

DESCRIPTION OF EMBODIMENTS

Figure 1:
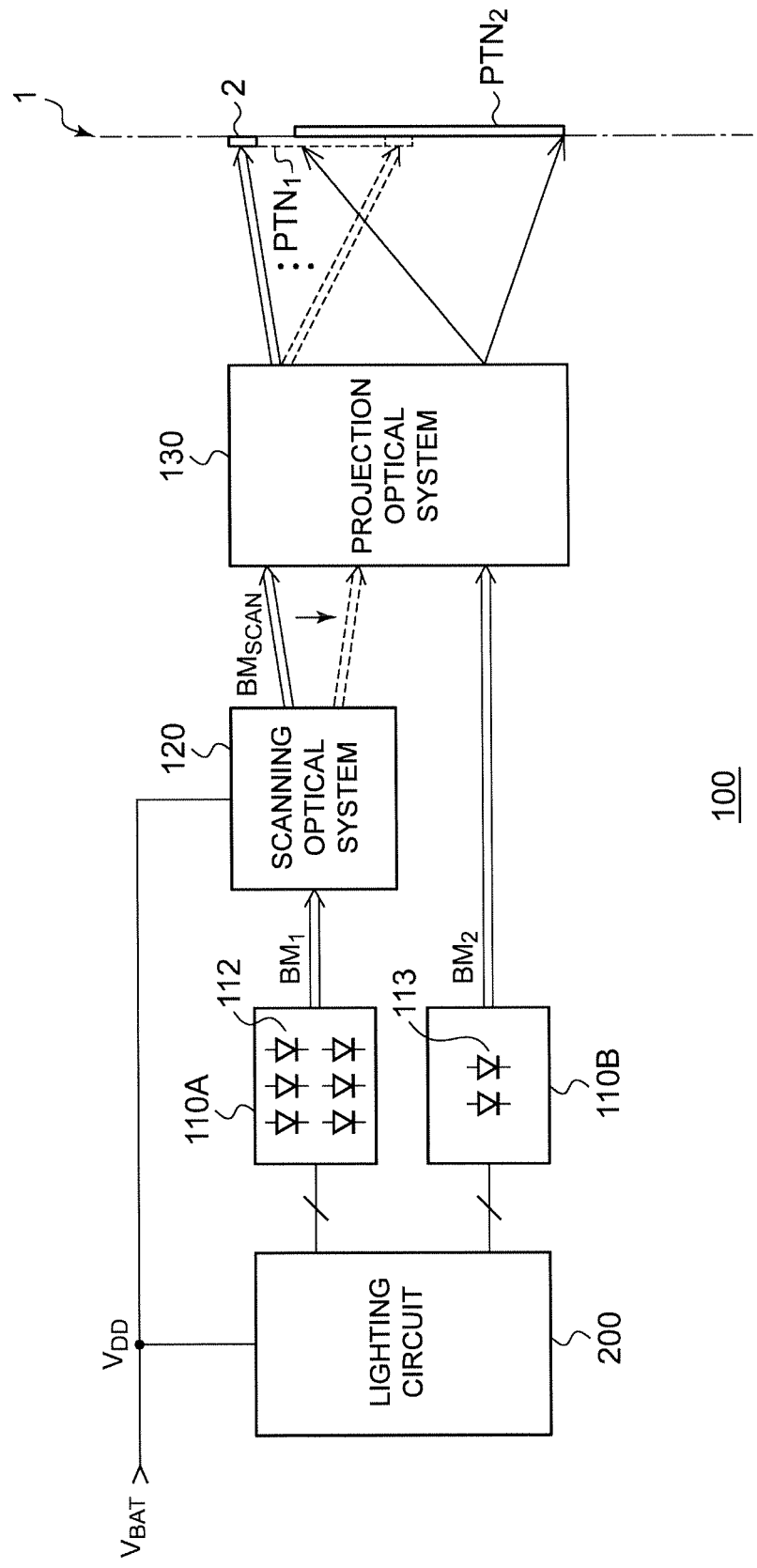
FIG. 1 is a block diagram of a vehicle lamp according to an embodiment.

The overview of a vehicle lamp according to an embodiment will be described. According to an embodiment, a vehicle lamp includes a first light source part, a second light source part, a scanning optical system which is configured to scan an emission beam from the first light source part by repeating a periodical motion, and a lighting circuit which is configured to independently drive the first light source part and the second light source part. A scanning beam scanned by the scanning optical system is projected to form a first pattern, and an emission beam from the second light source part is projected to form a second pattern.

By combining a light distribution pattern by scanning beam and a light distribution pattern by non-scanning beam, flexibility can be provided in a light distribution control, or constraint (a power supply voltage, a temperature, or the like) in generating a light distribution can be reduced.

At least a part of the second pattern may overlap with the first pattern, and the second pattern may be formed in at least a part of a high beam region.

Accordingly, even if the first pattern is turned off, a required minimum illuminance can be secured by the second pattern.

A battery voltage is often used as a power supply voltage of the vehicle lamp. An in-vehicle battery sometimes drops to about 6 V due to cranking from the rated voltage of 12 V, which can be a factor of a drop in the power supply voltage. As the power supply voltage drops, the operation of a motor or an actuator which scans emission light from the first light source part becomes unstable, and a scanning frequency can fluctuate. In order to stabilize the scanning frequency regardless of the drop in the power supply voltage, it is necessary to take measures to, such as, add a voltage regulator or a booster circuit and maintain a voltage supplied to the motor or an actuator driver regardless of a drop in the battery voltage. In one aspect, the lighting circuit may turn off the first light source part when the power supply voltage supplied to the vehicle lamp falls below a predetermined threshold.

When the power supply voltage drops, by turning off the first light source part and turning on only the second light source part, flicker and deterioration of light distribution accuracy can be suppressed. Since a countermeasure circuit for stabilizing the voltage supplied to the motor and the actuator driver can be simplified, it contributes to cost reduction in the vehicle lamp.

The lighting circuit may turn off the first light source part when the scanning frequency deviates from a specified range in the scanning optical system. For example, when the scanning frequency falls below the specified range, the flicker may occur. On the contrary, in an out-of-control state in which the scanning frequency exceeds the specified range, it is difficult to control the timing of the first light source part synchronized with the scanning, thereby causing the flicker or deterioration of the light distribution accuracy. The deterioration of the light distribution accuracy may include cases where a region which should be blocked is illuminated, or a sufficient illuminance cannot be obtained in a region where the illuminance should be increased. In such situations, by turning off the first light source part and turning on only the second light source part, the flicker can be suppressed or illumination of a light distribution pattern with low accuracy can be prevented.

The scanning optical system may include a motor, and a reflector attached to a rotation shaft of the motor. When an instruction for headlight flashing is input in a state where the first light source part and the second light source part are turned off and a rotation speed of the motor is lower than a predetermined value, a turning-off state of the first light source part may be maintained, and the second light source part may be instantaneously turned on.

A beam for headlight flashing may need be able to illuminate even when a headlamp is turned off. If the first pattern is used for the beam for headlight flashing, the motor and the actuator may need to be kept operating even in a turning-off state. In the lighting circuit, the second light source part may be instantaneously turned on (blinked) at the time of headlight flashing. Accordingly, it is not necessary to always operate the motor and the actuator when the headlamp is turned off.

Immediately after the start of operation of the scanning optical system, the lighting circuit may turn off the first light source part and turn on the second light source part until the scanning frequency reaches a predetermined frequency.

Hereinafter, a preferred embodiment of the present invention will be described with reference to the drawings. Identical or equivalent components, members, and processes shown in each drawing are given with same reference numerals, and repeated descriptions are omitted appropriately. Also, the embodiments are not intended to limit the scope of the present invention and are merely for illustration, and all features described in the embodiments and combinations thereof are not necessarily essential features of the present invention.

In the specification, "a state where a member A is connected to a member B" includes not only a case where the member A and the member B are connected physically and directly, but also a case where the member A and the member B are connected indirectly via other members without causing substantial effects on an electrical connection state thereof or impairing functions or effects due to the connection thereof.

Similarly, "a state where a member C is provided between a member A and a member B" includes not only a case where the member A and the member C, or the member B and the member C, are connected directly, but also a case where the member A and the member C, or the member B and the member C, are connected indirectly via other members without causing substantial effects on an electrical connection thereof or impairing functions or effects due to the connection thereof.

In the specification, reference numerals given to electrical signals such as voltage signals and current signals, or circuit elements such as resistors and capacitors represent voltage values, current values, resistance values or capacitance values as necessary.

FIG. 1 is a block diagram of a vehicle lamp 100 according to an embodiment. The vehicle lamp 100 is a scan type ADB head lamp and forms a light distribution pattern by superposing a light distribution based on scanning beam and a light distribution based on non-scanning beam. The vehicle lamp 100 includes a first light source part 110A, a second light source part 110B, a scanning optical system 120, a projection optical system 130, and a lighting circuit 200. The first light source part 110A is a light source for scanning and includes at least one light emitting unit 112. The second light source part 110B is a light source for widely illuminating a front area of a vehicle without scanning and includes at least one light emitting unit 113.

The scanning optical system 120 scans an emission beam $BM_1$ from the first light source part 110A by repeating a periodic motion. An emission beam of the scanning optical system 120 is referred to as a scanning beam $BM_{SCAN}$. In order to prevent flicker, a scanning frequency of the scanning optical system 120 is set to 60 Hz or higher, for example, about 200 Hz.

The projection optical system 130 projects the scanning beam $BM_{SCAN}$ scanned by the scanning optical system 120 to form a first pattern $PTN_1$ and projects an emission beam $BM_2$ from the second light source part 110B to form a second pattern $PTN_2$ at least part of which overlaps with the first pattern $PTN_1$. A reference numeral 1 in FIG. 1 represents a virtual vertical screen. A region illuminated by the scanning beam $BM_{SCAN}$ at a certain time is referred to as an illumination region 2. As the illumination region 2 moves on the virtual vertical screen 1, the first pattern $PTN_1$ is formed.

The projection optical system 130 may be configured by a reflection optical system, a transmission optical system, or a combination thereof. It is also possible to omit the projection optical system 130 by appropriately designing an diffusion angle, an emission angle, or the like of the emission beam of the first light source part 110A and an diffusion angle, an emission angle, or the like of the emission beam of the second light source part 110B.

The lighting circuit 200 independently drives the first light source part 110A and the second light source part 110B. The lighting circuit 200 may change illuminance of the illumination region 2 as time passes in synchronization with scanning motion of the scanning optical system 120. For example, if luminance of the first light source part 110A is set to zero in a certain time section during one scanning period, a region corresponding to that time section can be light-blocked. On the contrary, by increasing the luminance of the first light source part 110A in a certain time section during one scanning period, a region corresponding to that time section can be illuminated in a spot manner. The luminance of the first light source part 110A may be controlled according to drive current amounts supplied to the light emitting units 112, may be controlled according to the number of the light emitting units 112 which are turned on, or may be controlled by a combination thereof.

The lighting circuit 200 supplies a constant drive current to the second light source part 110B regardless of the scanning motion of the scanning optical system 120, and keeps the luminance thereof constant.

Figure 2A:
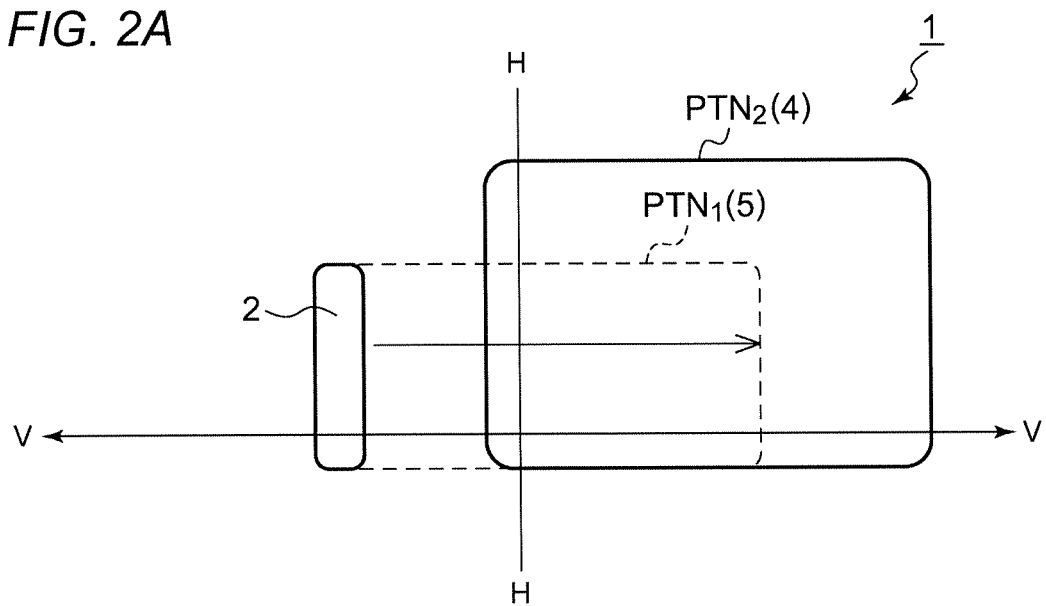
FIGS. 2A and 2B are diagrams illustrating formation of light distribution patterns by the vehicle lamp of FIG. 1.
Figure 2B:
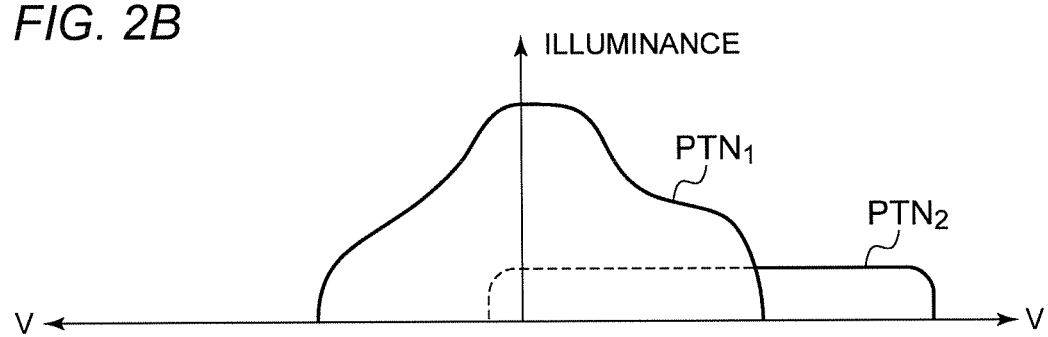

The configuration of the vehicle lamp 100 has been described above. Next, the operation of the vehicle lamp 100 will be described. FIGS. 2A and 2B are diagrams illustrating formation of light distribution patterns by the vehicle lamp 100 of FIG. 1.

FIG. 2A shows the virtual vertical screen 1 as viewed from above. For simplification of description, FIG. 2A shows only a light distribution pattern of a right lamp. In actual situation, the virtual vertical screen 1 is illuminated with superposition of the light distribution pattern of FIG. 2 and a light distribution pattern of a left lamp which is substantially mirror image thereof with respect to a line H-H.

On the virtual vertical screen 1, the first pattern $PTN_1$ formed by the scanning beam $BM_{SCAN}$ and the second pattern $PTN_2$ formed by the second beam $BM_2$ are projected. For example, the first pattern $PTN_1$ is illuminated to a region (hereinafter, referred to as a focused region 5) which should be further paid attention by a driver and adaptively control a light distribution according to the situation. Meanwhile, the second pattern $PTN_2$ is illuminated to a region (hereinafter, referred to as a diffusion region 4) which is lower in importance than the focused region 5 and should be illuminated with a specified light distribution regardless of the situation.

FIG. 2B shows an example of an illuminance distribution. In this example, a control is performed to increase the luminance of the first light source part 110A in the time section in which the illumination region 2 passes through the line H-H. The operation of the vehicle lamp 100 has been described above.

According to the vehicle lamp 100, by combining the light distribution pattern $PTN_1$ based on scanning beam and the light distribution pattern $PTN_2$ based on non-scanning beam, flexibility can be provided in a light distribution control, or constraint (a power supply voltage, a temperature, or the like) in generating a light distribution can be reduced.

If it is intended to form the light distribution patterns shown in FIGS. 2A and 2B only by scanning beam, a scanning range in an H direction of the illumination region 2 has to be expanded so as to cover the diffusion region 4. When the same light source is used to form the light distribution pattern $PTN_1$ with the same scanning frequency, the illuminance becomes higher when the scanning range in the H direction is narrow. If it is tried to obtain the same illuminance in a wide scanning range, luminance of the light source has to be increased, the cost of the light source increases, and further the cost for dealing with necessary heat radiation also increases, so that the overall cost of the first light source part 110A is increased.

In this respect, according to the vehicle lamp 100 of FIG. 1, by combining the light distribution by scanning beam and the light distribution by non-scanning beam, a degree of freedom in design of the first light source part 110A can be improved, which may lower the total cost.

(Control of Light Source Part)

Subsequently, a control of the first light source part 110A will be described. Immediately after the start of operation of the scanning optical system 120, the scanning frequency is lower than the specified range. After starting the operation of the scanning optical system 120, the lighting circuit 200 turns off the first light source part 110A during a start-up period until the scanning frequency reaches the specified range, so that flicker is suppressed. During the start-up period, only the second light source part 110B may be turned on in advance.

After completion of the start-up period and the scanning frequency is once included in the specified range, at least one of the following controls is executed.

A scanning operation of the scanning optical system 120 and the luminance control of the first light source part 110A may need to be synchronized with each other. Therefore, high accuracy on the time axis is required for the luminance control of the first light source part 110A by the lighting circuit 200. Meanwhile, the vehicle lamp 100 operates with a battery voltage $V_{BAT}$ as a power supply voltage $V_{DD}$. An in-vehicle battery sometimes drops to about 6 V due to cranking from the rated voltage of 12 V, which can be a factor of a drop in the power supply voltage $V_{DD}$ of the vehicle lamp 100.

As the power supply voltage $V_{DD}$ drops, the operation of a motor (an actuator) of the scanning optical system 120 becomes unstable, and when the power supply voltage $V_{DD}$ is extremely lowered, the scanning optical system 120 cannot maintain the scanning frequency within the specified range. In order to maintain the scanning frequency regardless of the drop in the power supply voltage $V_{DD}$, it is necessary to take measures to, such as, add a voltage regulator or a booster circuit, and maintain a voltage supplied to the motor and an actuator driver regardless of a drop in the battery voltage $V_{BAT}$, thereby increasing the cost of the vehicle lamp 100.

In this respect, in the vehicle lamp 100 according to the embodiment, control to turn off the first light source part 110A is available in a situation where the scanning frequency fluctuates, so that the flicker can be suppressed. Even though the first light source part 110A is turned off, so that the illuminance decreases, a required minimum illuminance can be secured by the second pattern $PTN_2$ of the second light source part 110B.

Figure 3:
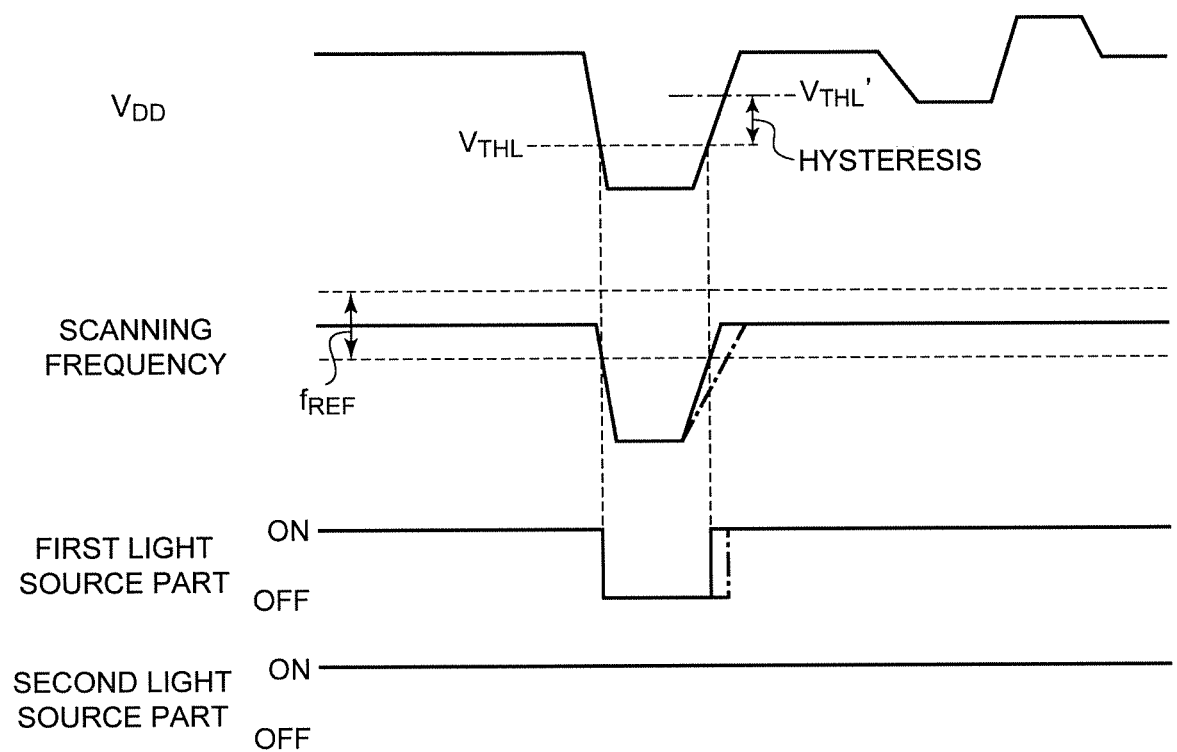
FIG. 3 is an operation waveform diagram of the vehicle lamp of FIG. 1.

In the embodiment, the lighting circuit 200 may turn off the first light source part 110A when the power supply voltage $V_{DD}$ supplied to the vehicle lamp 100 falls below a predetermined threshold $V_{THL}$. The threshold $V_{THL}$ may be a voltage value at which the scanning optical system 120 cannot maintain the scanning frequency within a target range. By controlling the turning on/off of the first light source part 110A based on the power supply voltage $V_{DD}$, the flicker can be favorably prevented. FIG. 3 is an operation waveform diagram of the vehicle lamp 100 according to the embodiment. When the power supply voltage $V_{DD}$ falls below the threshold $V_{THL}$, the turning-on state of the second light source part 110B is maintained, and the first light source part 110A is turned off. As a result, even when the scanning frequency deviates from a target range $f_{REF}$, the flicker can be prevented.

After the power supply voltage $V_{DD}$ returns from a situation where the scanning frequency once decreases, a certain delay may occur until the scanning frequency returns to the target range $f_{REF}$ (a dashed line). In this case, by setting hysteresis in the threshold $V_{THL}$ and making the threshold at the time of returning higher as shown in the dashed line $V_{THL}'$, flicker can be more reliably prevented.

From other viewpoints, it can be said that the lighting circuit 200 turns off the first light source part 110A when the scanning frequency deviates from a specified range (target range) in the scanning optical system 120. In this viewpoint, the lighting circuit 200 may monitor the scanning frequency in addition to or instead of the power supply voltage $V_{DD}$.

The scanning optical system 120 which is described later may include a motor, and a reflector attached to a rotation shaft of the motor. In this case, since a rotation speed of the motor corresponds to the scanning frequency, the lighting circuit 200 may control turning on/off of the first light source part 110A based on the rotation speed of the motor. Specifically, when the rotation speed of the motor deviates from a predetermined range, the first light source part 110A may be turned off. When the rotation speed of the motor falls below a predetermined lower limit value, the first light source part 110A is turned off, so that flicker can be prevented.

In addition, when the rotation speed of the motor exceeds a predetermined upper limit value, the first light source part 110A may be turned off. When the motor operates out of control to exceed a certain speed, it is difficult to control the timing of the luminance of the first light source part 110A synchronized with the scanning, thereby causing the flicker or deterioration of the light distribution accuracy. The deterioration of the light distribution accuracy includes cases where a region which should be blocked is illuminated, or a sufficient illuminance cannot be obtained in a region where the illuminance should be increased. In the situation of excessive speed, by turning off the first light source part 110A and turning on only the second light source part 110B, the flicker can be suppressed or illumination of a light distribution pattern with low accuracy can be prevented.

(Headlight Flashing)

A beam for headlight flashing may need to be able to illuminate even when a headlamp is turned off. If the first pattern $PTN_1$ is used for the beam for headlight flashing, when an instruction for headlight flashing is generated while the scanning optical system 120 is stopped, since the scanning frequency is unspecified, flicker occurs in the beam for headlight flashing. In order to avoid the flicker, it is necessary to keep the scanning frequency within the specified range by operating the motor or the actuator even in the turning-off state of the headlamp. Further, blinking the first pattern $PTN_1$ formed by scanning for purpose of headlight flashing may be a factor of complicating the control.

In the embodiment, the lighting circuit 200 may control the second light source part 110B to blink when the instruction for headlight flashing is received from a vehicle side. Since the headlight flashing is realized by blinking of the second light source part 110B, it is not necessary to always operate the motor or the actuator when the headlamp is turned off. Further, since a process of blinking the non-scanning second light source part 110B is simple, a control system thereof can be simplified.

Figure 4A:
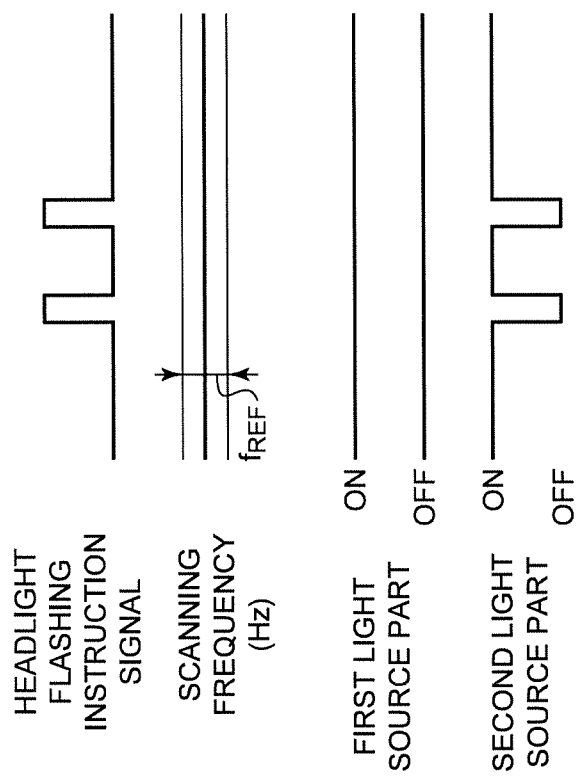
FIGS. 4A and 4B are waveform diagrams illustrating a headlight flashing operation of the vehicle lamp of FIG. 1.
Figure 4B:
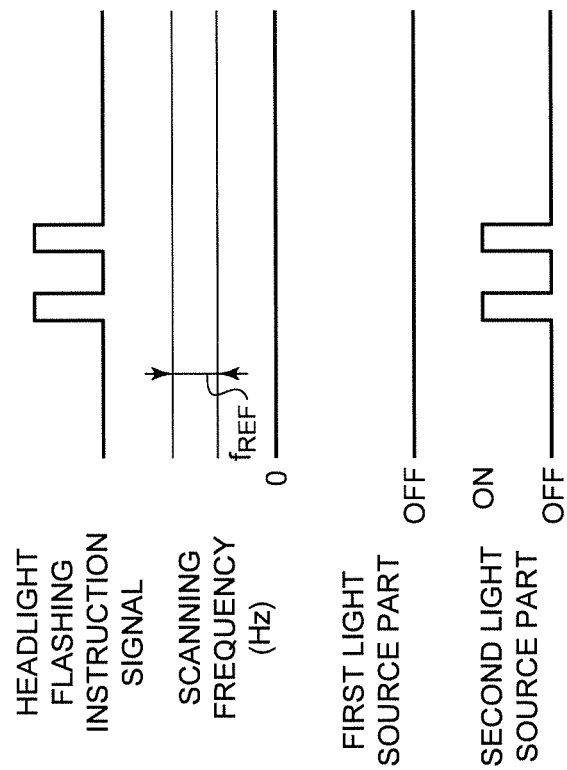

FIGS. 4A and 4B are waveform diagrams illustrating a headlight flashing operation of the vehicle lamp 100 of FIG. 1. FIG. 4A shows a headlight flashing operation of the vehicle lamp 100 in the turning-off state. The scanning optical system 120 is stopped, the scanning frequency is zero (0 Hz), and both the first light source part 110A and the second light source part 110B are turned off. In this state, when the instruction for headlight flashing is input, the lighting circuit 200 instantaneously turns on (blinks) the second light source part 110B while the turning-off state of the first light source part 110A is maintained.

FIG. 4B shows a headlight flashing operation of the vehicle lamp 100 in the turning-on state. The scanning frequency is stabilized to the target range $f_{REF}$, and the first light source part 110A and the second light source part 110B are turned on. In this state, when the instruction for headlight flashing is input, the lighting circuit 200 turns off the second light source part 110B for a short time and blinks the second light source part 110B.

If the second light source part 110B is turned off when the instruction for headlight flashing is received, the second light source part 110B may be turned on for a short time to cause the second light source part 110B to blink.

Subsequently, a more specific configuration example of the vehicle lamp 100 will be described.

Figure 5:
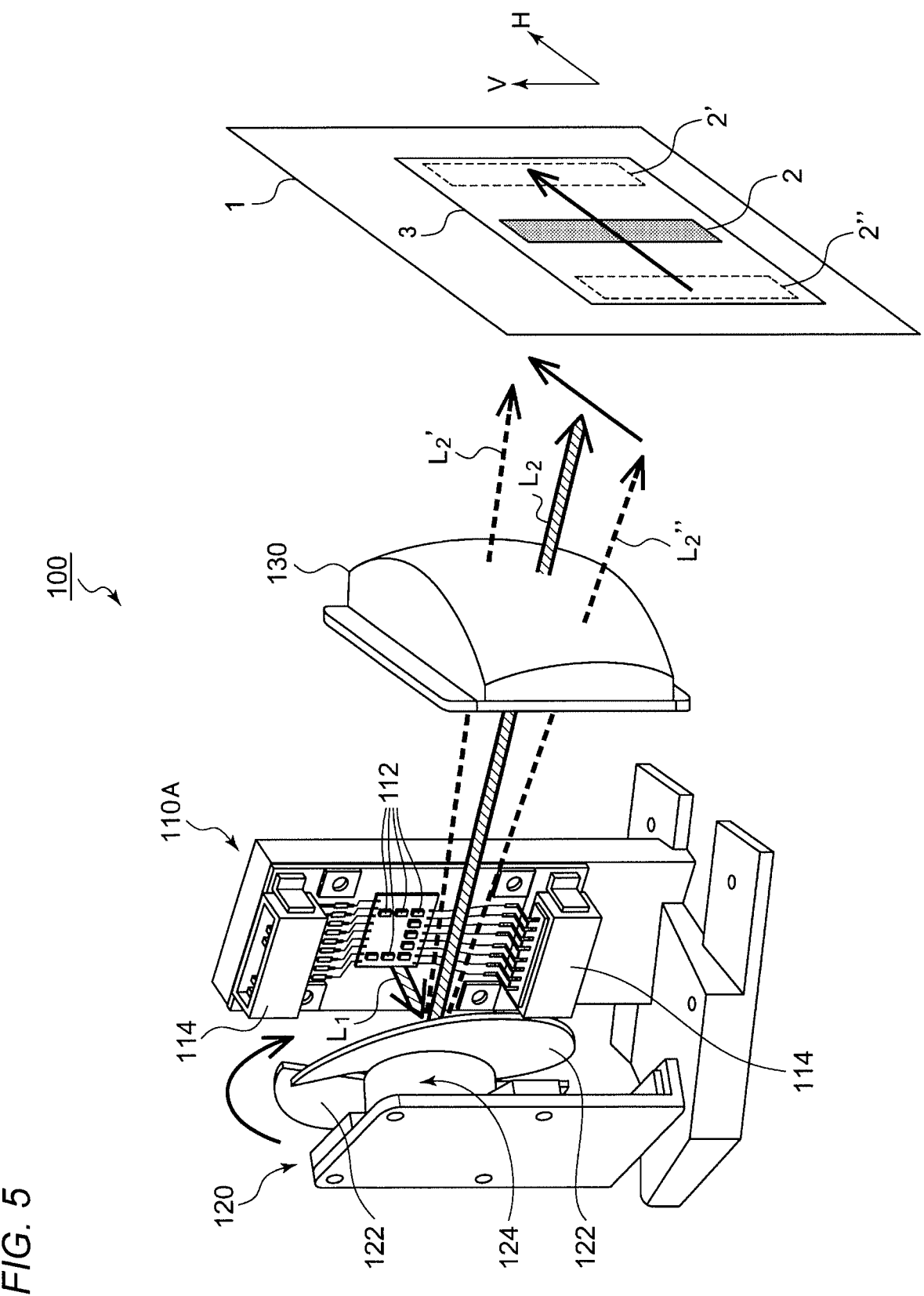
FIG. 5 is a perspective view of the vehicle lamp according to the embodiment.

FIG. 5 is a perspective view of the vehicle lamp 100 according to the embodiment. In the vehicle lamp 100 of FIG. 5, a plurality of light distribution modes can be selected according to a traveling scene.

FIG. 5 shows the first light source part 110A, the scanning optical system 120 and the projection optical system 130. As described above, the first light source part 110A includes the plurality of light emitting units 112. The plurality of light emitting units 112 are connected to the lighting circuit 200 (not shown) via a connector 114. The light emitting units 112 include semiconductor light sources such as light emitting diodes (LED) and semiconductor lasers (LD). One light emitting unit 112 configures a minimum control unit of luminance and turning on/off. One light emitting unit 112 may be one LED chip (LD chip), or may include a plurality of LED chips (LD chips) connected in series and/or in parallel.

The scanning optical system 120 receives emission light $L_1$ from the first light source part 110A and repeats a periodic motion so as to scan reflected light $L_2$ at a front area of the vehicle in a horizontal direction (an H direction in the figure). The projection optical system 130 projects the reflected light $L_2$ of the scanning optical system 120 onto the virtual vertical screen in front of the vehicle. The projection optical system 130 may be configured by a reflection optical system, a transmission optical system, or a combination thereof.

Specifically, the scanning optical system 120 includes a reflector 122 and a motor 124. The reflector 122 is attached to a rotor of the motor 124 and performs a rotational motion. In the present embodiment, two reflectors 122 are provided, and the emission light $L_2$ is scanned twice per rotation of the motor 124. Therefore, a scanning frequency is twice the rotation speed of the motor. Incidentally, the number of reflectors 122 is not particularly limited.

At a certain time to, the emission light $L_1$ from the first light source part 110A is reflected at an angle corresponding to a position of the reflector 122 (a rotation angle of the rotor), and the reflected light $L_2$ at this time forms one illumination region 2 on the virtual vertical screen 1 in front of the vehicle. In FIG. 5, the illumination region 2 is shown to be rectangular for simplification of description, but a shape of the illumination region 2 is not limited to be rectangular as described later.

When the position of the reflector 122 changes at another time $t_1$, a reflection angle changes, and the reflected light $L_2'$ at that time forms an illumination region 2'. When the position of the reflector 122 changes at another time $t_2$, a reflection angle changes, and the reflected light $L_2''$ at that time forms an illumination region 2''.

Since the scanning optical system 120 rotates at a high speed, the illumination region 2 scans the virtual vertical screen 1, so that a light distribution pattern 3 is formed in front of the vehicle.

Figure 6A:
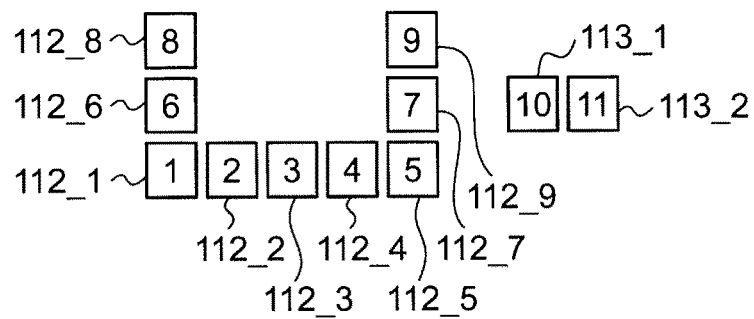
FIGS. 6A to 6D are diagrams illustrating formation of a light distribution pattern.

FIGS. 6A to 6D are diagrams illustrating formation of the light distribution pattern 3. FIG. 6A shows a layout of the plurality of light emitting units 112 in the first light source part 110A. In the present embodiment, the number of the plurality of light emitting units 112 is nine.

The plurality of light emitting units 112 are arranged in two or more stages in a height direction and in three stages in this example, and the number of the light emitting units 112 on the lowest stage is the largest. Therefore, a region with high illuminance can be formed in the vicinity of a line H on the virtual vertical screen.

The vehicle lamp 100 according to the present embodiment forms a light distribution pattern by superposing the light distribution by scanning beam and the light distribution by non-scanning beam. The first light source part 110A and the second light source part 110B described above can configure one light source part 110, and in addition to a plurality of light emitting units for scanning 112_1 to 112_9, the light source part 110 includes at least one light emitting unit(s) 113_1, 113_2 for widely illuminating a front area of a vehicle with non-scanning beam. Emission light of the light emitting units 113_1, 113_2 is illuminated to the virtual vertical screen 1 via an optical system (not shown) different from the scanning optical system 120.

Figure 6B:
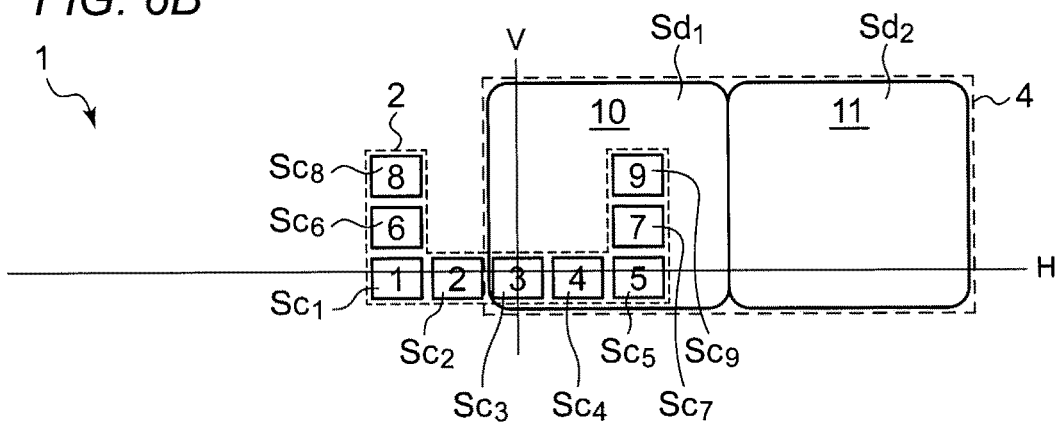

FIG. 6B is a diagram showing illumination spots formed by the emission light from the light emitting units 112, 113 on the virtual vertical screen 1 when the reflector 122 is at a predetermined position.

Each of illumination spots formed by the light emitting units for scanning 112 is referred to as a focused spot Sc. A reference numeral $Sc_i$ represents a focused spot formed by the i-th ($1 \leq i \leq 9$) light emitting unit 112-i. A set of a plurality of focused spots $Sc_1$ to $Sc_9$ in FIG. 6B corresponds to the illumination region 2 in FIG. 5.

Each of illumination spots formed by the light emitting units for diffusion 113 on the virtual vertical screen 1 is referred to as a diffusion spot Sd. A reference numeral $Sd_i$ represents a diffusion spot formed by the i-th lighting emitting unit 113-i. The diffusion spot Sd is irrelevant to the rotation of the reflector 122. A set of the diffusion spots $Sd_1$, $Sd_2$ is referred to as the diffusion region 4.

FIG. 6B shows only the illumination spots Sc, Sd of a right side lamp. In a case where the right side lamp and a left side lamp are symmetrical, the illumination spots are formed by the left side lamp in which the illumination spots of FIG. 6B are inverted in a left-right direction with respect to a line V.

Figure 6C:
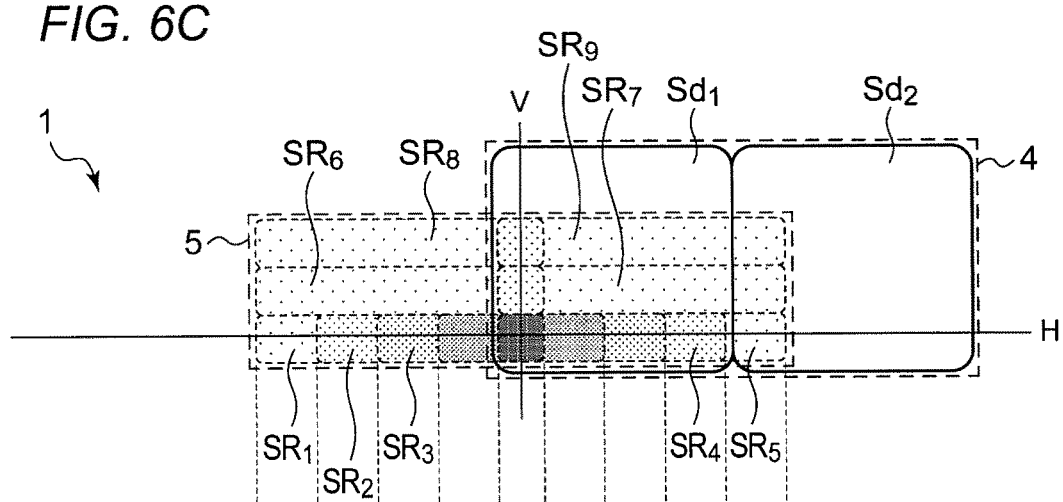

FIG. 6C shows regions SR (referred to as scanning regions) through which each focused spot Sc passes when the reflector 122 is rotated. A reference numeral $SR_i$ represents a region through which the i-th focused spot $Sc_i$ passes. A set of the scanning regions $SR_1$ to $SR_9$, that is, the region where the illumination region 2 is scanned is referred to as the focused region 5. The focused region 5 overlaps the diffusion region 4.

Figure 6D:
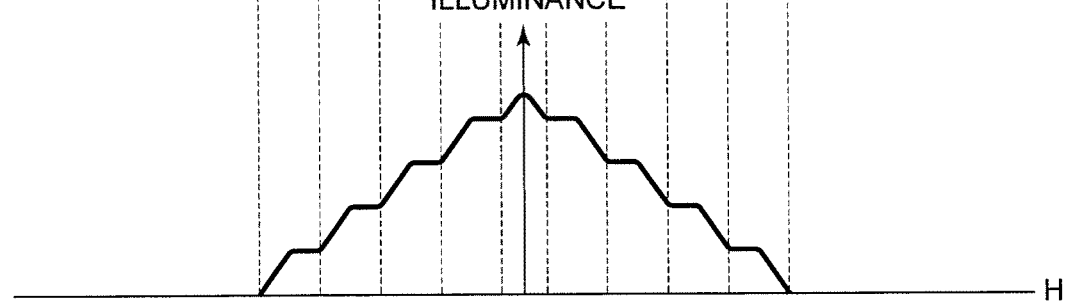

FIG. 6D shows an illuminance distribution in a horizontal direction of the light distribution pattern in the vicinity of the line H formed by the light emitting units 112_1 to 112_5 on the lowest stage.

The actually formed light distribution pattern is a superposition of a light distribution pattern of the right side lamp and a light distribution pattern of the left side lamp. In this example, the focused region 5 of the left side lamp substantially overlaps with the focused region 5 of the right side lamp. The diffusion region 4 of the right side lamp mainly illuminates a right side of the line V, and the diffusion region 4 (not shown) of the left side lamp mainly illuminates a left side of the line V.

Accordingly, the plurality of light emitting units for scanning 112_1 to 112_9 are arranged such that the emission light thereof separately illuminates different portions on the virtual vertical screen. As shown in FIG. 6A, the plurality of light emitting units 112 are preferably arranged in a U shape. By arranging the plurality of light emitting units 112 in the U shape (or an E shape in FIG. 13B), right ends and left ends of the focused regions at the first, second and third stages can be aligned.

The correspondence between the plurality of light emitting units 112 and channels is, for example, as follows:

a first channel $CH_1$=the light emitting units 112_1, 112_2;

a second channel $CH_2$=the light emitting unit 112_3;

a third channel $CH_3$=the light emitting units 112_4, 112_5;

a fourth channel $CH_4$=the light emitting units 112_6, 112_7; and a fifth channel $CH_5$=the light emitting units 112_8, 112_9.

The plurality of light emitting units 112 are arranged in three stages in the height direction, and the light emitting units 112 illuminating a same height are classified into a same channel such that the same amount of drive current is supplied thereto.

The light emitting units for the diffusion region 113_1, 113_2 are set as a sixth channel $CH_6$.

A basic configuration of the vehicle lamp 100 has been described above. Subsequently, the operation of vehicle lamp 100 will be described.

Figure 7A:
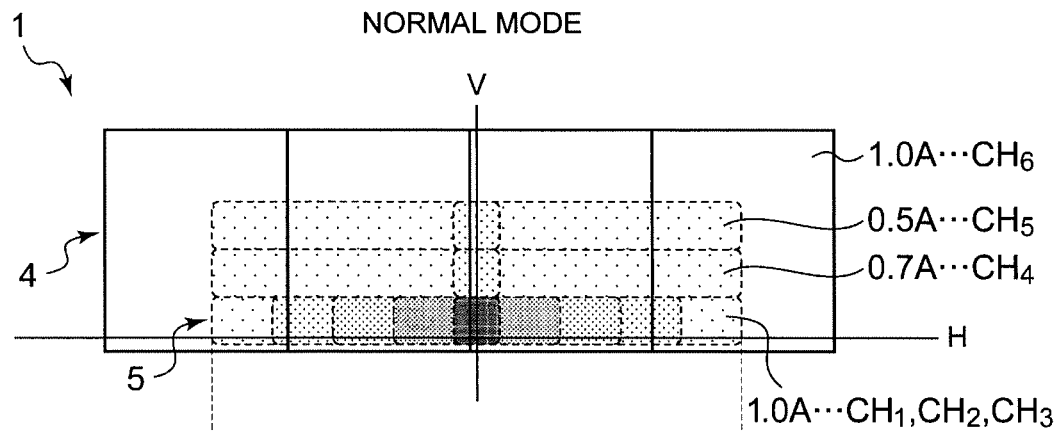
FIGS. 7A to 7C are diagrams illustrating specific examples of a plurality of light distribution modes which can be realized by the vehicle lamp.
Figure 7B:
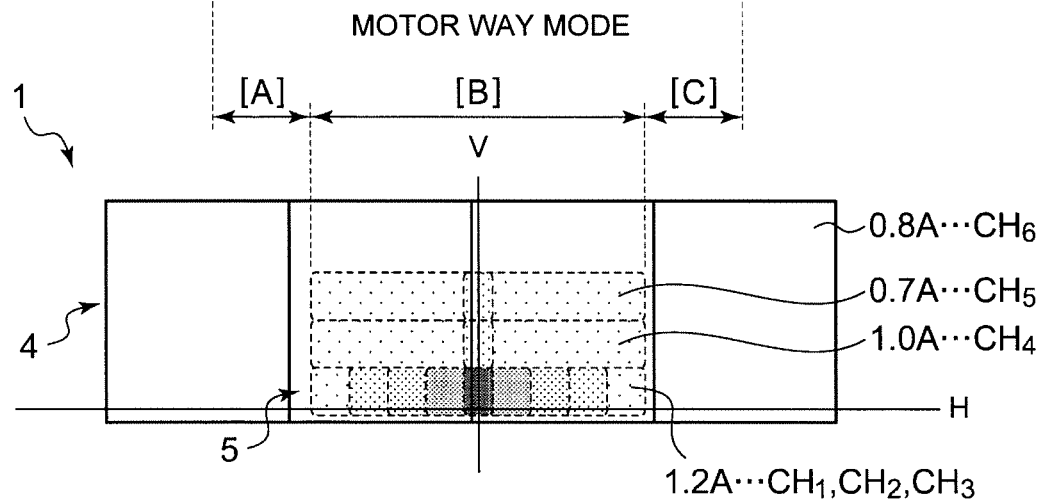
Figure 7C:
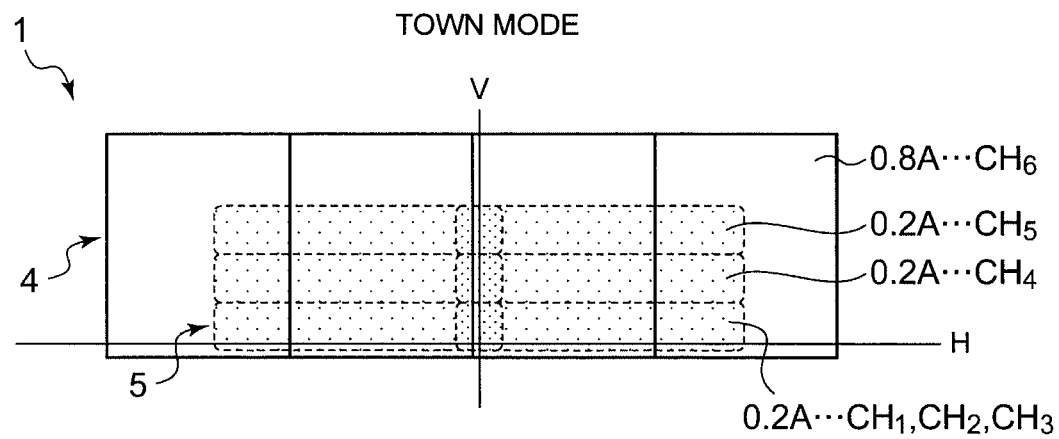

FIGS. 7A to 7C are diagrams illustrating specific examples of a plurality of light distribution modes which can be realized by the vehicle lamp 100. For example, one of the plurality of light distribution modes is a normal mode shown in FIG. 7A, another one of the plurality of light distribution modes is a motor way mode shown in FIG. 7B, and a further one of the plurality of light distribution modes is a town mode shown in FIG. 7C. FIGS. 7A to 7C show light distribution patterns on the virtual vertical screen 1 in each of the light distribution modes, and the superposition of both left and right lamps is shown. FIGS. 7A to 7C show current amounts of drive currents $I_{DRV}$ to be supplied to the light emitting units 112 of the channels.

Referring to FIG. 7A, in the normal mode, each of setting values of drive currents of the three channels $CH_1$, $CH_2$, and CH$_3$ on the lowest stage is 1.0 A, a setting value of a drive current of the channel CH$_4$ on the second stage from the bottom is 0.7 A, and a setting value of a drive current of the channel CH$_5$ on the uppermost stage is 0.5 A. A setting value of a drive current of the channel for diffusion CH$_6$ is 1.0 A. All the light emitting units 112 maintain the turning-on state during the scanning period.

The motor way mode is selected on expressways or toll roads. Referring to FIG. 7B, in the motor way mode, each of setting values of drive currents of the three channels CH$_1$, CH$_2$, and CH$_3$ on the lowest stage is 1.2 A, a setting value of a drive current of the channel CH$_4$ on the second stage from the bottom is 1.0 A, and a setting value of a drive current of the channel CH$_5$ on the uppermost stage is 0.7 A. A setting value of a drive current of the channel for diffusion CH$_6$ is 0.8 A. That is, the diffusion region 4 in the motor way mode is set to be darker than that in the normal mode.

In the motor way mode, widths of the scanning regions SR of the light emitting units 112 are narrower than that in the normal mode of FIG. 7A such that a width of the focused region 5 in the motor way mode is narrower than the width of the focused region 5 in the normal mode. Accordingly, by increasing the luminance of the light emitting units 112, the center illuminance is intensively enhanced.

The town mode is selected in an urban area where there are many street lamps. Referring to FIG. 7C, in the town mode, each of setting values of drive currents of all the channels CH$_1$ to CH$_5$ is 0.2 A. A setting value of a drive current of the channel for diffusion CH$_6$ is 0.8 A. That is, the diffusion region 4 in the town mode is set to be darker than that in the normal mode.

In the town mode, the width of the focused region 5 is substantially equal to the width of the focused region 5 in the normal mode, but the illuminance of the light emitting units 112 is set to be lower by greatly reducing the luminance thereof. A bypass switch is controlled such that all the light emitting units 112 maintain the turning-on state during the scanning period.

The operation of the vehicle lamp 100 has been described above.

According to the vehicle lamp 100, while supplying a constant drive current I$_{DRV}$ defined for each channel to the plurality of light emitting units 112, by turning on/off each light-emitting unit 112 at an appropriate timing, a desired light distribution pattern can be formed.

By changing the current amount of the drive current I$_{DRV}$ and the timings of turning on/off the light emitting units 112, the light distribution pattern can be changed, and the plurality of light distribution modes can be realized.

The light distribution modes may be switched adaptively according to a traveling scene, or may also be switched according to an instruction from a user. Since there is also no need to change the drive current at high speed during the turning on period within one scanning period of the light emitting unit, the design of the constant current driver for generating the drive current can be simplified.

The inventive concept of the present invention extends to various devices, methods, and systems derived from the above description and is not limited to the specific configuration. Hereinafter, in order to facilitate understanding of the essence and operation of the invention and clarify them, a more specific configuration example and embodiment will be described which is not intended to narrow the scope of the present invention.

Figure 8:
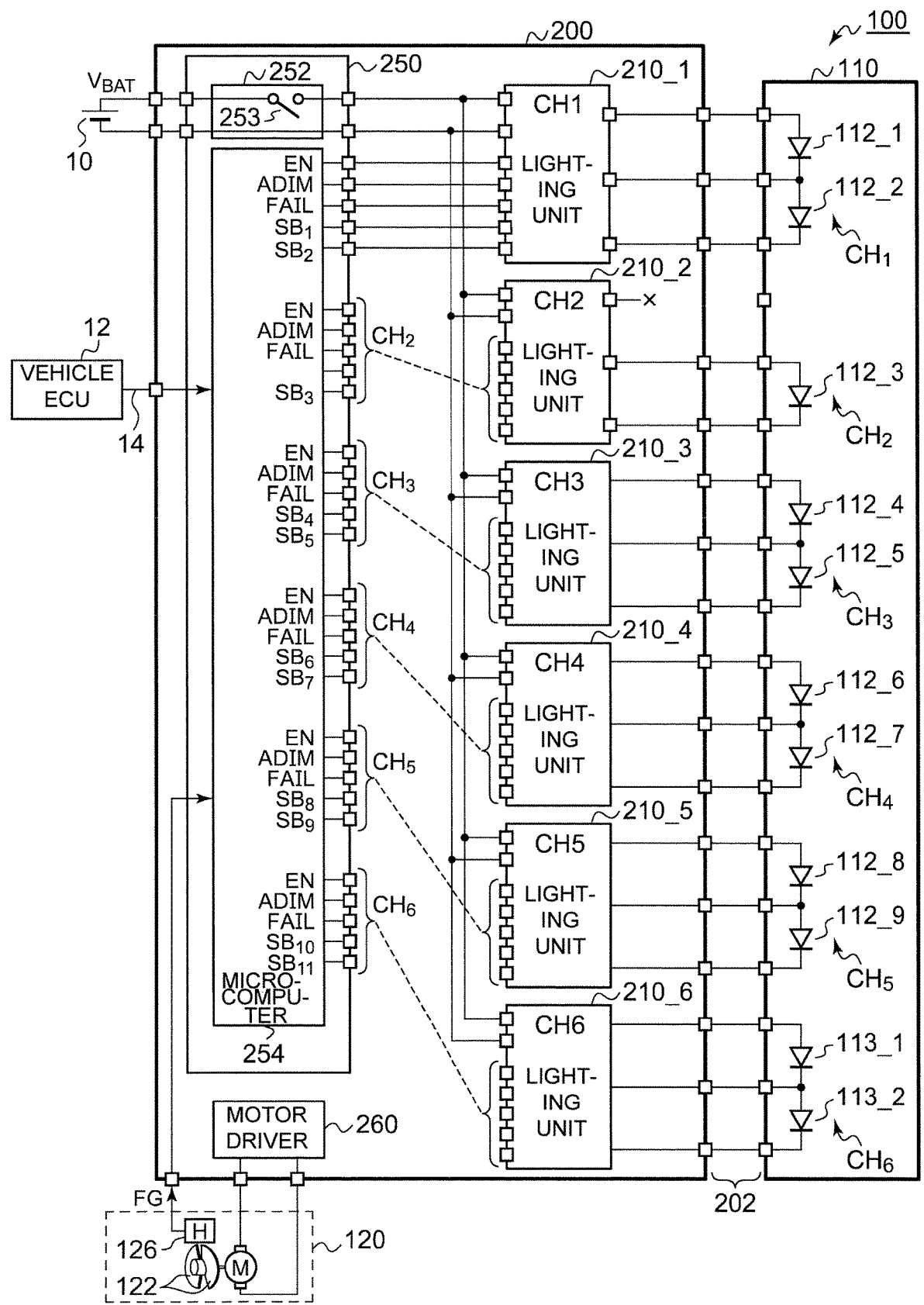
FIG. 8 is a block diagram illustrating an electrical system of the vehicle lamp.

A more specific configuration example of the vehicle lamp 100 will be described. FIG. 8 is a block diagram illustrating an electrical system of the vehicle lamp 100. The vehicle lamp 100 includes the light source part 110 and the lighting circuit 200. As described above, the light source part 110 includes the plurality of light emitting units for scanning 112, and the plurality of light emitting units for diffusion 113.

As described above, the plurality of light emitting units for scanning 112_1 to 112_9 are divided into the plurality of channels CH$_1$ to CH$_5$. The plurality of light emitting units 112 included in the same channel are arranged so as to illuminate the same height on the virtual vertical screen. In other words, the plurality of light emitting units 112 arranged to illuminate the same height on the virtual vertical screen are included in the same channel.

Specifically, as shown in FIG. 6, the plurality of light emitting units 112_1, 112_2 which illuminate the lowest stage on the virtual vertical screen 1 form the first channel CH$_1$, the light emitting unit 112_3 forms the second channel CH$_2$, and the light emitting units 112_4, 112_5 form the third channel CH$_3$. The plurality of light emitting units 112_6, 112_7 which illuminate the second stage from the bottom form the fourth channel CH$_4$. The plurality of light emitting units 112_8, 112_9 which illuminate the third stage from the bottom form the fifth channel CH$_5$. The plurality of light emitting units 112 included in the same channel are connected in series. Meanwhile, the light emitting units for diffusion 113_1, 113_2 form another channel CH$_6$.

The lighting circuit 200 is connected to the light source part 110 via harnesses 202, receives a direct current voltage (battery voltage) V$_{BAT}$ from a battery 10, and drives the plurality of light emitting units 112. Specifically, the lighting circuit 200 can control the luminance of the light emitting units 112 on a channel basis and can individually control turning on/off for each light emitting unit 112.

The lighting circuit 200 includes a plurality of lighting units 210_1 to 210_5 (and 210_6) corresponding to the plurality of channels CH$_1$ to CH$_5$ (and CH$_6$), a lamp electronic control unit (ECU) 250, and a motor driver 260. The lamp ECU is also simply referred to as a controller.

The lamp ECU 250 controls the plurality of lighting units 210_1 to 210_6. The lamp ECU 250 includes, for example, an input unit 252 and a microcomputer 254. The input unit 252 includes a semiconductor switch 253 provided in a supply path of the battery voltage V$_{BAT}$ and a noise elimination filter (not shown). The microcomputer 254 is connected to a vehicle ECU 12 via a bus 14 for in-vehicle network such as a Local Interconnect Network (LIN) or a Controller Area Network (CAN). From the vehicle ECU 12 to the microcomputer 254, (i) information indicating a traveling scene or a light distribution mode, (ii) information indicating a region which should be blocked, or the like are transmitted. Based on the information from the vehicle ECU 12, the microcomputer 254 selects the light distribution mode and forms a light blocking region.

The motor driver 260 drives the motor 124 of the scanning optical system 120 to stabilize the rotation speed to a target value. The motor 124 may be, for example a brushless DC motor. The circuit configuration of the motor driver 260 is not particularly limited, and a known motor driver may be used. The scanning optical system 120 outputs a periodic rotation signal FG synchronized with the rotation of the reflector 122. The signal FG may be generated based on a Hall signal generated by a Hall element 126.

For example, as shown in FIG. 5, when two reflectors 122 are provided, the Hall element may be positioned such that the rotation signal FG transits to a high level every time a gap (slit) between the two reflectors 122 passes a reference position.

The signal FG is input to the controller 250. The controller 250 controls the lighting units 210_1 to 210_5 in synchronization with the signal FG. For the lighting unit 210_6, synchronization with the signal FG is unnecessary.

Figure 9:
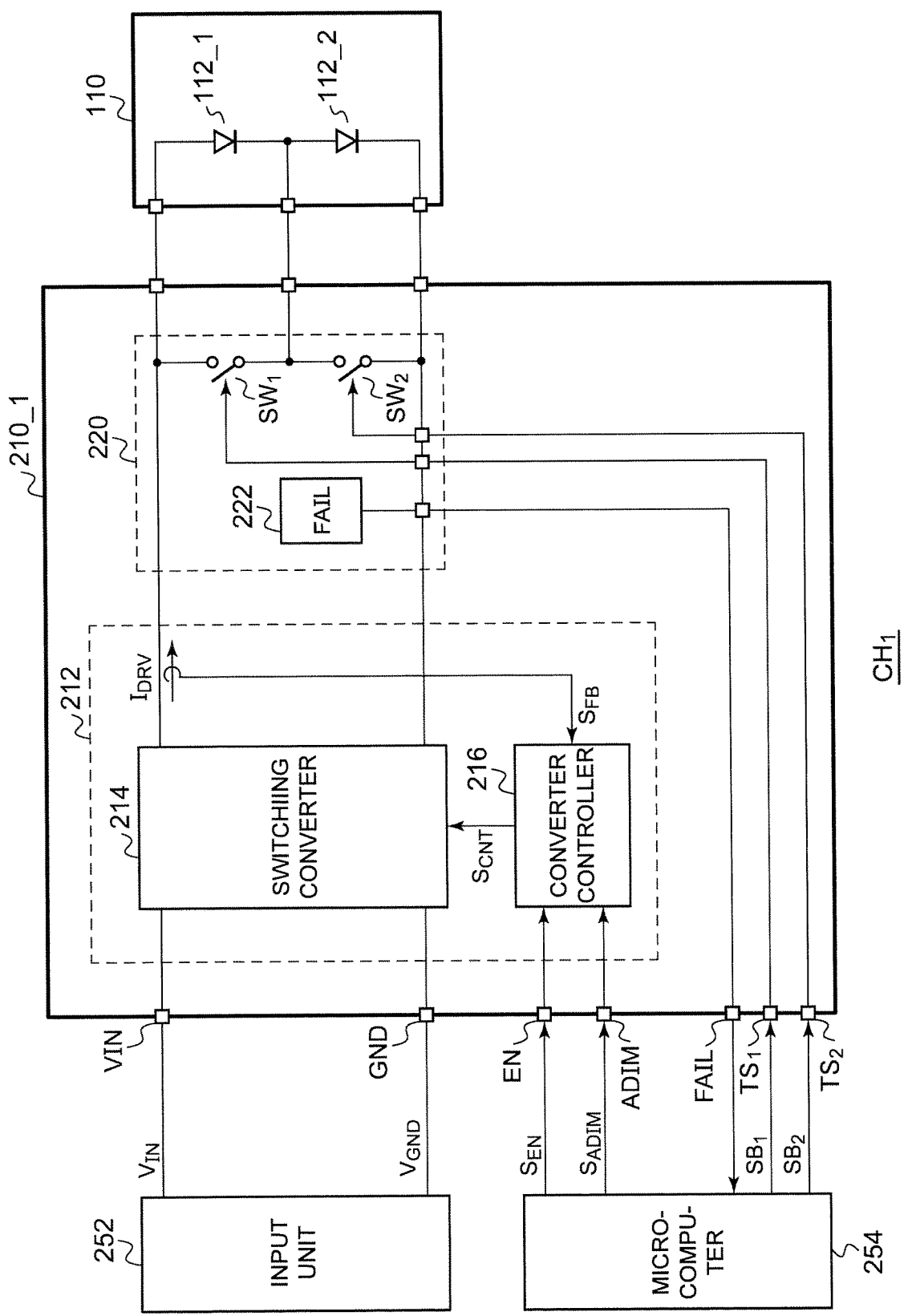
FIG. 9 is a block diagram illustrating a configuration for one channel of the vehicle lamp.

FIG. 9 is a block diagram illustrating a configuration for one channel of the vehicle lamp 100. Each channel includes the plurality of light emitting units 112, the lighting unit 210, and a part of the microcomputer 254 of the lamp ECU 250. Herein, the first channel $CH_1$ is explained as an example.

The lighting unit 210 includes a constant current driver 212 and a bypass circuit 220. A battery voltage (input voltage $V_{IN}$) is supplied to a VIN pin (input voltage) of the lighting unit 210 via the input unit 252. A ground voltage $V_{GND}$ is supplied to a GND (ground) pin. An enable signal $S_{EN}$ which instructs the operation and stop of the constant current driver 212 is input to a EN (enable) pin, and a DC dimming signal $S_{ADIM}$ which instructs a target value of the drive current $I_{DRV}$ generated by the constant current driver 212 is input to a DC dimming (ADIM) pin.

The constant current driver 212 supplies the drive current $I_{DRV}$ to the plurality of light emitting units 112_1, 112_2 included in the corresponding channel $CH_1$. For example, the constant current driver 212 includes a switching converter 214 and a converter controller 216. The switching converter 214 is a buck converter, a boost converter, or a buck-boost converter, and receives the input voltage $V_{IN}$ (battery voltage $V_{BAT}$) supplied to the VIN pin. The system of the switching converter 214 is determined according to the number of the light emitting units 112 to be driven.

In the present embodiment, if at most two light emitting units 112 are allocated to one channel, the switching converter 214 can be unified to the buck converter.

The converter controller 216 generates a control pulse $S_{CNT}$ for driving a switching element of the switching converter 214. The converter controller 216 controls at least one of a duty ratio, a frequency, and density of the control pulse $S_{CNT}$ such that a detection value (a feedback signal $S_{FB}$) of the drive current $I_{DRV}$ approaches a target value indicated by the DC dimming signal $S_{ADIM}$ from the microcomputer 254.

A control method of the converter controller 216 is not particularly limited, and a known circuit may be used. For example, the converter controller 216 may be a ripple control controller, and may adopt hysteresis control, a peak detection OFF time fixed method, a bottom detection ON time fixed method, or the like. Alternatively, the converter controller 216 may be a pulse width modulation (PWM) controller using an error amplifier, or may also be a digital controller using a PI control or a PID control.

The bypass circuit 220 includes a plurality of bypass switches $SW_1$, $SW_2$. Each of the bypass switches SW can form a bypass path parallel to the corresponding one of the light emitting units 112_1, 112_2 included in the corresponding channel $CH_1$. Each of the bypass switches SW can be configured by a field effect transistor (FET), or the like. ON/OFF of the bypass switches $SW_1$, $SW_2$ is controlled according to bypass control signals SB1, SB2 from the microcomputer 254. A fail detection circuit 222 detects an open or short-circuit abnormality of the light emitting units 112, and generates a fail signal.

The configuration of the first channel $CH_1$ has been described above. The second to sixth channels $CH_2$ to $CH_6$ are configured similarly. When the bypass switch $SW_j$ ($1 \le j \le 9$) is off, since the drive current $I_{DRV}$ flows to the corresponding light emitting unit 112-$j$, the light emitting unit 112-$j$ emits light. When the bypass switch $SW_j$ is on, since the drive current $I_{DRV}$ flows to a bypass switch $SW_j$ side instead of the light emitting unit 112-$j$, the light emitting unit 112-$j$ turns off.

The lamp ECU 250 (microcomputer 254) is configured to switch the plurality of light distribution modes. The microcomputer 254 controls, in each light distribution mode, (i) the drive current $I_{DRV}$ to be generated by the constant current driver 212, and (ii) a period (a period to be turned off) during which each of the plurality of bypass switches SW should be on during one scanning period, for each of the plurality of lighting units 210_1 to 210_5.

Figure 10A:
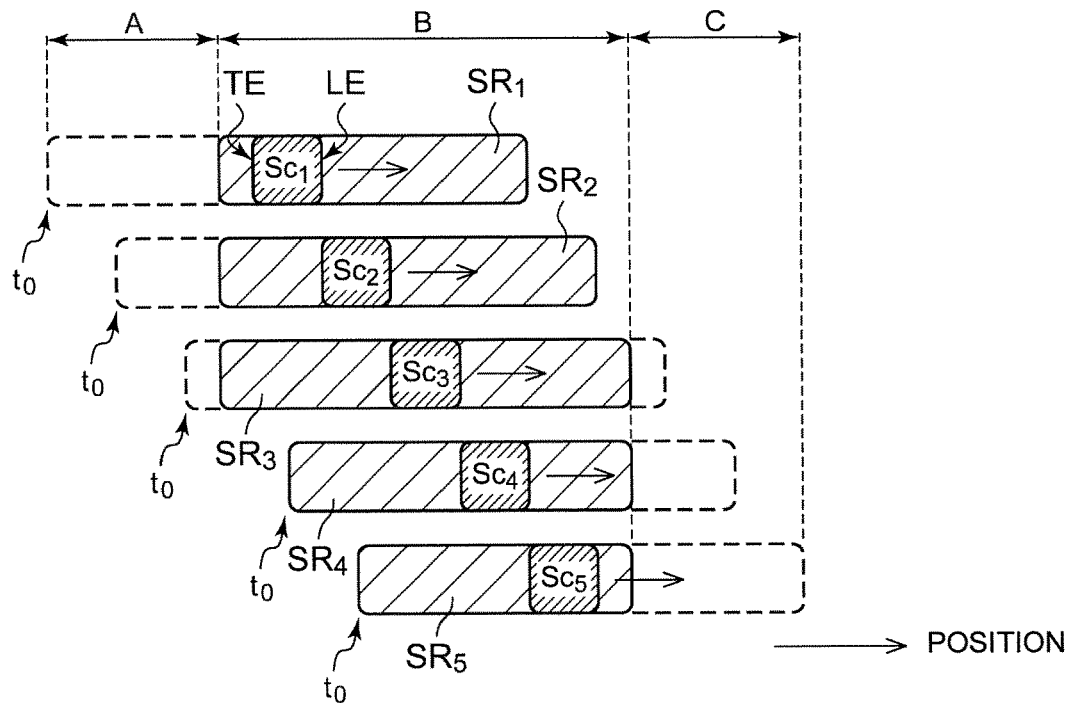
FIGS. 10A and 10B are diagrams illustrating formation of a light distribution pattern in a motor way mode.
Figure 10B:
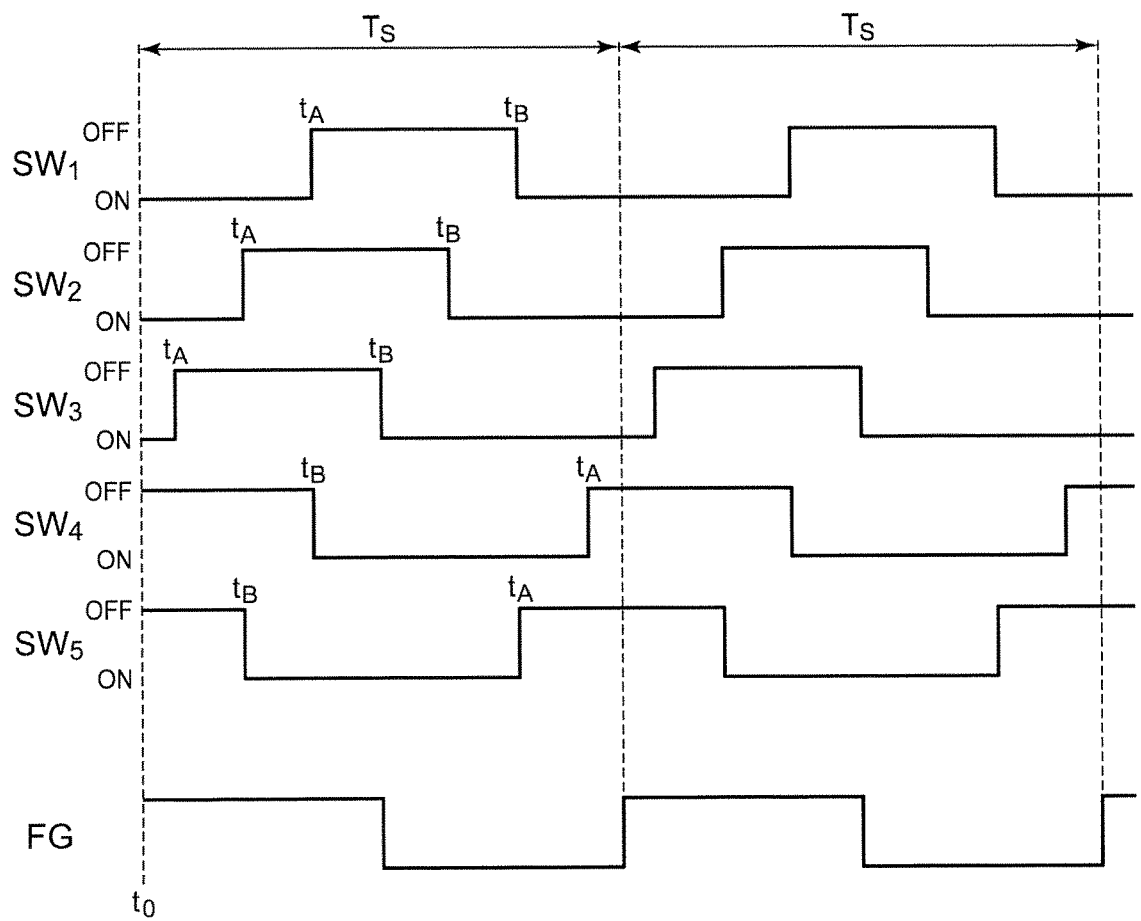

FIGS. 10A and 10B are diagrams illustrating formation of a light distribution pattern in the motor way mode. FIG. 10A is a diagram in which the plurality of scanning regions $SR_1$ to $SR_5$ are shifted and arranged for easy viewing. In the scanning regions SR, a hatched range shows an illumination region (B) in which light is actually illuminated, and a dashed line shows a non-illumination region (A, C) in which no light is illuminated. The reference numerals $Sc_1$ to $Sc_5$ indicate positions of the focused spots at the same time. Each focused spot Sc is scanned from the left to the right in the drawing, a right end of the focused spot Sc is a leading edge LE, and a left end thereof is a trailing edge TE. At a certain time to, the trailing edge TE of the focused spot $Sc_i$ is positioned at a left end of the illumination region $SR_j$.

FIG. 10B is a time chart illustrating states of the plurality of bypass switches $SW_1$ to $SW_5$. Since the bypass switches (a set of $SW_1$, $SW_6$, and $SW_8$, or a set of $SW_5$, $SW_7$, and $SW_9$) at the same horizontal position may be controlled at the same timing, only the control of the bypass switches $SW_1$ to $SW_5$ is shown here. The i-th bypass switch $SW_i$ is turned off during a period in which the corresponding focused spot $Sc_i$ passes through the illumination region B, and is turned on during a period in which the corresponding focused spot $Sc_i$ passes through the non-illumination region (A, C). A reference numeral $T_S$ represents a scanning period.

A timing $t_A$ at which each of the bypass switches SW is turned off (turning-on of the light emitting unit 112) may be a timing at which a trailing edge (left end) TE of the corresponding focused spot Sc passes a left end of the illumination region. On the other hand, a timing is at which each of the bypass switches SW is turned on (turning-off of the light emitting unit 112) may be a timing at which a leading edge (right end) of the corresponding focused spot Sc reaches a right end of the illumination region. Accordingly, the illuminance in the non-illumination region can be set to zero.

The transition timings $t_A$, $t_B$ of each of the bypass switches SW may be defined as values obtained by normalizing elapsed time from a certain reference time to with the scanning period $T_s$. Accordingly, even if the rotation speed of the motor changes and the scanning period $T_s$ varies, the bypass switches SW can be controlled at an appropriate timing. Incidentally, the reference time to may be matched with a changing point of the signal FG.

Figure 11A:
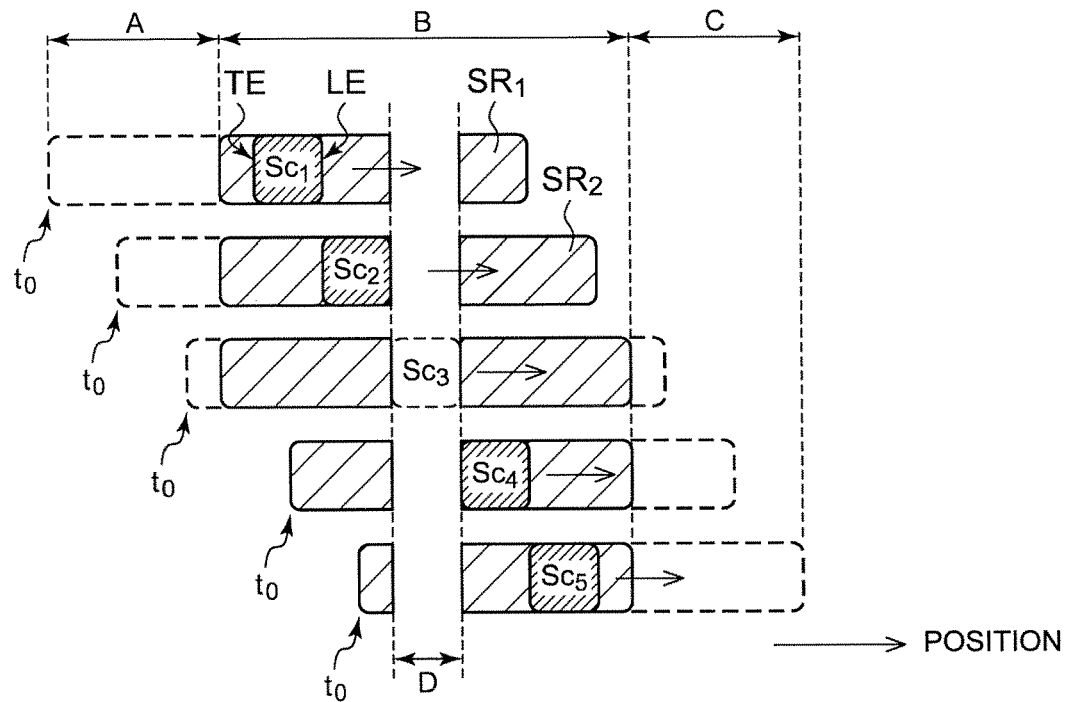
FIGS. 11A and 11B are diagrams illustrating formation of a light blocking region.
Figure 11B:
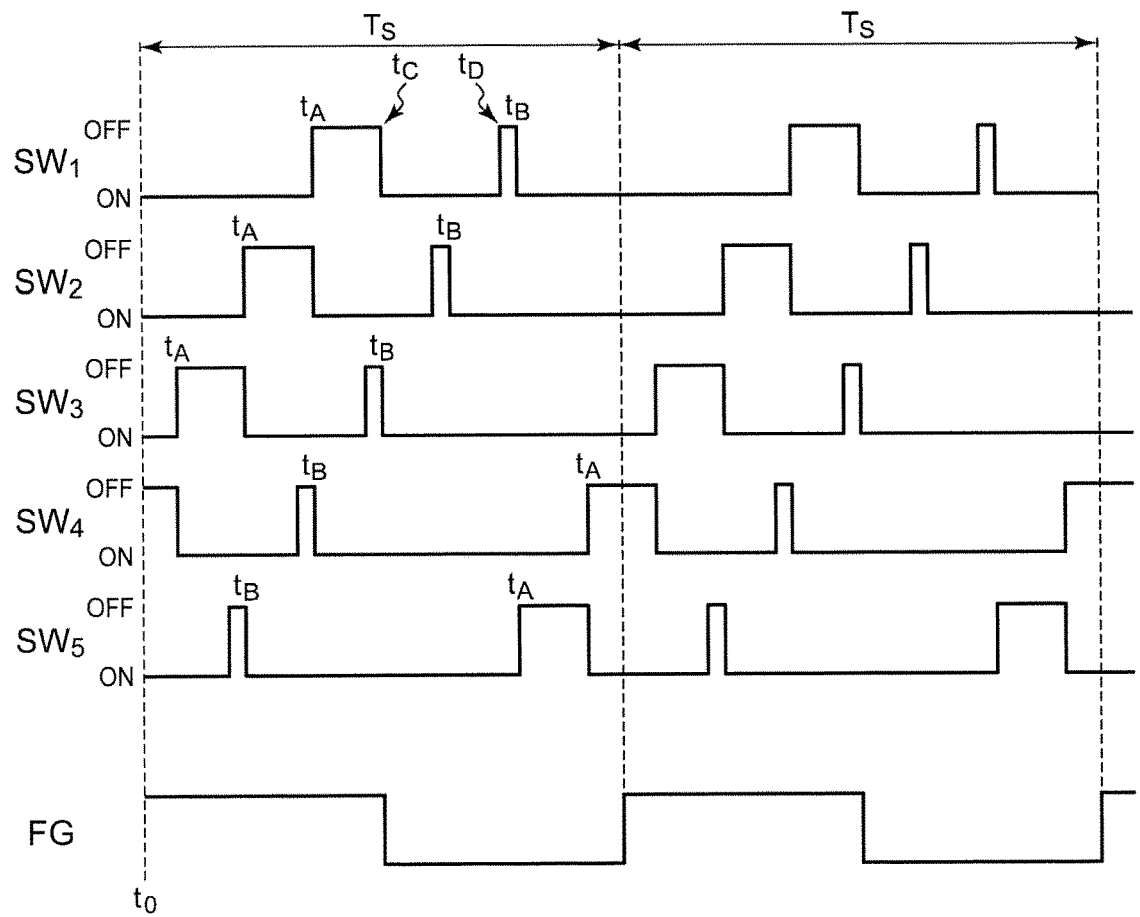

Subsequently, formation of the light blocking region will be described. FIGS. 11A and 11B are diagrams illustrating the formation of the light blocking region. FIG. 11A is a diagram in which the plurality of scanning regions $SR_1$ to $SR_5$ are shifted and arranged for easy viewing. FIG. 11B is a time chart illustrating states of the plurality of bypass switches $SW_1$ to $SW_5$. Herein, the motor way mode is explained as an example. The light blocking region is shown by a reference numeral D. The i-th bypass switch $SW_i$ is controlled so as to be turned on during a period in which the corresponding focused spot $Sc_i$ passes through the light blocking region D.

A timing $t_C$ at which each of the bypass switches SW is turned on (turning-off of the light emitting unit 112) corresponding to the light blocking region D may be a timing at which the leading edge (right end) LE of the corresponding focused spot Sc reaches a left end of the light blocking region D. On the other hand, a timing $t_D$ at which each of the bypass switches SW is turned off (turning-on of the light emitting unit 112) may be a timing at which the trailing edge (left end) TE of the corresponding focused spot Sc reaches a right end of the light blocking region D.

Figure 12A:
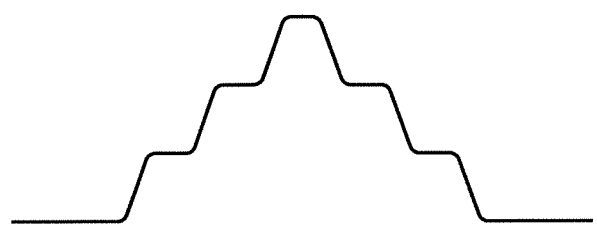
FIGS. 12A to 12C are diagrams illustrating an electric swivel control.
Figure 12B:
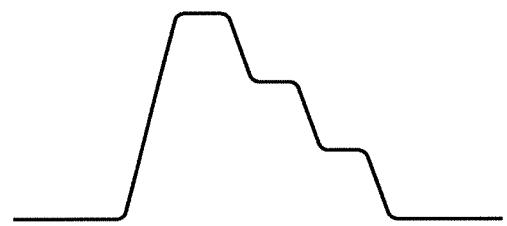
Figure 12C:
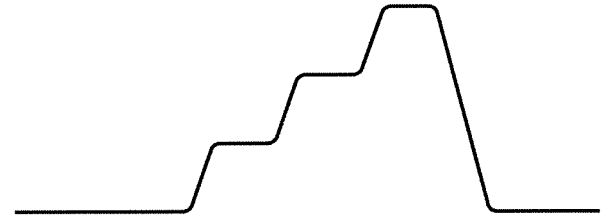

As shown in FIG. 6C, the five light emitting units 112_1 to 112_5 on the lowest stage are divided into the three channels $CH_1$ to $CH_3$. As will be described below, an electronic swivel control can be performed. FIGS. 12A to 12C are diagrams illustrating the electronic swivel control. FIGS. 12A to 12C respectively show the light distribution patterns (the illuminance distribution) in the vicinity of the line H on the virtual vertical screen formed by the light emitting units 112 on the lowest stage. FIGS. 12A to 12C correspond to a straight path, a left curve path and a right curve path, respectively.

The present invention has been described above based on the embodiment. It should be understood by those skilled in the art that this embodiment is merely an example, various modifications can be made to the combination of each configuration element and each processing process, and such modifications are also within the scope of the present invention. Hereinafter, such modifications will be described.

(First Modification)

Regarding the control of the bypass switches SW, in a case of allowing light to be illuminated to the non-illumination region, the timing to at which each of the bypass switches SW is turned off (turning-on of the light emitting unit 112) may be a timing at which the leading edge (right end) LE of the focused spot Sc passes the left end of the illumination region.

On the contrary, the timing $t_B$ at which each of the bypass switches SW is turned on (turning-off of the light emitting unit 112) may be a timing at which the trailing edge (left end) TE of the focused spot Sc reaches the right end of the illumination region.

(Second Modification)

In the embodiment, as shown in FIG. 6A, the plurality of light emitting units 112 are arranged in the U shape, but not limited thereto. FIGS. 13A to 13C are diagrams illustrating modifications of layouts of the light emitting units 112. In FIG. 13A, the plurality of light emitting units 112 are arranged in an inverted T shape. In FIG. 13B, the plurality of light emitting units 112 are arranged in a fallen E shape. In FIG. 13C, the plurality of light emitting units 112 are arranged in a fallen L shape. Which arrangement should be selected may be determined according to a diffusion angle of emission light from the projection optical system 130.

In the embodiment, the focused regions 5 formed by the right side lamp and the left side lamp overlap each other substantially in the same range, but the focused regions 5 may overlap with each other at a part of the center.

(Third Modification)

In the light distribution modes in FIGS. 7A to 7C, the drive currents of the three channels $CH_1$ to $CH_3$ illuminating the same height are equal, but not limited thereto. For example, in the motor way mode, the drive currents of the three channels $CH_1$ to $CH_3$ may be different.

(Fourth Modification)

In the embodiment, the number of the light emitting units 112 per channel is set to one or two, but not limited thereto. Three or more light emitting units 112 may be allocated to one channel and driven by one constant current driver.

(Fifth Modification)

The configuration of the scanning optical system 120 is not limited to that shown in FIG. 5. For example, the illumination spot may be scanned by a polygon mirror or a galvanometer mirror. Alternatively, the emission angles of the plurality of light emitting units 112 may be controlled by an actuator.

(Sixth Modification)

In the embodiment, as shown in FIG. 6B, the plurality of light emitting units 112 are arranged such that the plurality of focused spots Sc formed by the plurality of light emitting units 112 do not overlap on the virtual vertical screen 1, but not limited thereto. The focused spots corresponding to two or more light emitting units 112 may be overlapped on the virtual vertical screen 1.

(Seventh Modification)

In the embodiment, the second light source part 110B including the light emitting units 113 forms the diffusion region which makes the wide region substantially uniformly bright, but it is not limited thereto. The non-scanning second light source part 110B may be a high beam light source, and may also be a distance-illuminating high beam which illuminates a distant area farther than a normal high beam.

(Eighth Modification)

In the embodiment, attention is focused mainly on the fluctuation of the scanning frequency due to fluctuation of the power supply voltage, but not limited thereto. For example, when a temperature abnormality occurs, a protection function may be activated to lower the rotation speed of the motor or the luminance of a semiconductor light source. Also in this case, by turning off the first light source part, flicker can be suppressed and deterioration of the light distribution accuracy can be reduced. Alternatively, in a case where the first light source part 110A blinks due to a temperature abnormality or the fluctuation of the power supply voltage, even if the scanning frequency is normal, the first light source part 110A may be turned off.

Although the present invention has been described with specific terms and phrases based on the embodiments, the embodiments merely show the principle and application of the present invention, and various changes of modifications and configurations may be made in the embodiments without departing from the spirit of the present invention as defined in the claims.

The invention claimed is:
1. A vehicle lamp comprising:
 a first light source part;
 a second light source part;
 a scanning optical system which is configured to scan an emission beam from the first light source part by repeating a periodical motion; and
 a lighting circuit which is configured to independently drive the first light source part and the second light source part,
 wherein a scanning beam scanned by the scanning optical system is projected to form a first pattern, and an emission beam from the second light source part is projected to form a second pattern,
 wherein the scanning optical system includes a motor and a reflector provided to a rotation shaft of the motor, and
 wherein the lighting circuit is configured when an instruction for headlight flashing is input in a state where the first light source part and the second light source part are turned off and a rotation speed of the motor is lower than a predetermined value, to maintain a turning-off state of the first light source part and turn on the second light source part.

2. The vehicle lamp according to claim 1, wherein at least a part of the second pattern overlaps with the first pattern, and the second pattern is formed in at least a part of a high beam region.

3. The vehicle lamp according to claim 1, wherein the lighting circuit is configured to turn off the first light source part when a power supply voltage supplied to the vehicle lamp falls below a predetermined threshold.

4. The vehicle lamp according to claim 1, wherein the lighting circuit is configured to turn off the first light source part when a scanning frequency deviates from a specified range in the scanning optical system.

5. The vehicle lamp according to claim 1, wherein the lighting circuit is configured, immediately after start of operation of the scanning optical system, to turn off the first light source and turn on the second light source part until a scanning frequency reaches a predetermined frequency.

6. A vehicle lamp comprising:
a first light source part;
a second light source part;
a scanning optical system which is configured to scan an emission beam from the first light source part by repeating a periodical motion; and
a lighting circuit which is configured to independently drive the first light source part and the second light source part,
wherein a scanning beam scanned by the scanning optical system is projected to form a first pattern, and an emission beam from the second light source part is projected to form a second pattern, and
wherein the lighting circuit is configured to turn off the first light source part when a scanning frequency deviates from a specified range in the scanning optical system.

7. The vehicle lamp according to claim 6, wherein at least a part of the second pattern overlaps with the first pattern, and the second pattern is formed in at least a part of a high beam region.

8. A vehicle lamp comprising:
a first light source part;
a second light source part;
a scanning optical system which is configured to scan an emission beam from the first light source part by repeating a periodical motion; and
a lighting circuit which is configured to independently drive the first light source part and the second light source part,
wherein a scanning beam scanned by the scanning optical system is projected to form a first pattern, and an emission beam from the second light source part is projected to form a second pattern, and
wherein the lighting circuit is configured, immediately after start of operation of the scanning optical system, to turn off the first light source and turn on the second light source part until a scanning frequency reaches a predetermined frequency.

9. The vehicle lamp according to claim 8, wherein at least a part of the second pattern overlaps with the first pattern, and the second pattern is formed in at least a part of a high beam region.

\* \* \* \* \*